(12) United States Patent
Jostler et al.

(10) Patent No.: US 8,709,580 B2
(45) Date of Patent: Apr. 29, 2014

(54) CARRIER OR TRANSPORT STRIP

(75) Inventors: Johan Jostler, Halmstad (SE); Jan Jostler, Halmstad (SE); Sven Olof Berg, Haverdal (SE)

(73) Assignee: Pronova AB, Halmstead (SE)

( * ) Notice: Subject to any disclaimer, the term of this patent is extended or adjusted under 35 U.S.C. 154(b) by 1152 days.

(21) Appl. No.: 12/300,850

(22) PCT Filed: May 25, 2007

(86) PCT No.: PCT/SE2007/000506
§ 371 (c)(1),
(2), (4) Date: Nov. 14, 2008

(87) PCT Pub. No.: WO2007/139466
PCT Pub. Date: Dec. 6, 2007

(65) Prior Publication Data
US 2009/0117375 A1    May 7, 2009

(30) Foreign Application Priority Data
May 26, 2006 (SE) ..................... 0601163

(51) Int. Cl.
*B32B 3/00*      (2006.01)
*B32B 3/02*      (2006.01)
*B32B 23/02*     (2006.01)

(52) U.S. Cl.
USPC ............................ 428/157; 428/156; 428/192

(58) Field of Classification Search
USPC ............ 428/192, 156, 157; 383/6, 16, 17, 21, 383/33; 248/95, 97, 99, 100, 101
See application file for complete search history.

(56) References Cited

U.S. PATENT DOCUMENTS 3,836,068 A * 9/1974 Schwarzkopf ................. 383/27
4,000,768 A * 1/1977 Siegel ............................. 383/23

FOREIGN PATENT DOCUMENTS

| EP | 0 063 868 | 11/1982 |
|---|---|---|
| EP | 0 437 848 | 7/1991 |
| EP | 0 798 101 | 10/1997 |
| EP | 798101 A1 * | 10/1997 |
| EP | 1 095 759 | 5/2001 |
| FR | 2 676 194 | 11/1992 |
| WO | 2005/023693 | 3/2005 |

* cited by examiner

*Primary Examiner* — Catherine A Simone
(74) *Attorney, Agent, or Firm* — Ladas & Parry LLP

(57) ABSTRACT

The present invention encompasses a carrier strip (1) adapted with an edge-related thickened portion (2) to be able to cooperate with a carrier device, formed with a slit, in order to fixedly retain a bag, adapted for one or more piece goods. The carrier strip (1) otherwise has the form of a plastic film (3). To said plastic film (3) said thickened portion (2) is applied as a plastic strand and that the plastic film (3) and the thickened portion (2) are, such as via a melting, integrated formed with one another.

17 Claims, 2 Drawing Sheets

US 8,709,580 B2

CARRIER OR TRANSPORT STRIP

TECHNICAL FIELD

Figure 1:
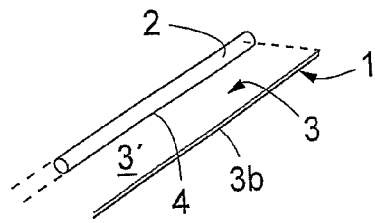

The present invention relates in general to a carrier or transport strip and then more particularly to such a carrier strip as is adapted to be able to expose an edge-related thickened portion, given such cross section which entail that the carrier strip will be able to cooperate with a carrier device provided with a slit and where the cooperation between the thickened portion of the carrier strip and said slit in the carrier device will be able to offer an easy displacement of the carrier strip in relation to the carrier device.

More particularly, the carrier strip is built on being adapted in order to be coordinated with a container and thereby form a bag unit.

Thus the carrier strip shall be able to fixedly retain a container, adapted for one or more piece goods, for forming said bag unit.

A number of side-by-side oriented containers and which are coordinated with one another by one or more carrier strips are then directly adapted to a method in order to permit packing of one or more piece goods in one or more bag units, where said bag units, in a selected transport direction, are oriented after one another with a space between individual containers.

More particularly, it is a matter of containers after containers shall be coordinated via one and the same carrier strip (or two carrier strips) in order with the help of two, each allocated their bag unit side, disposed carrier strips respectively with a thickened portion along the upper longitudinally oriented edge portion of the strip and where a disclosed method can comprise the functional steps which are defined in a simultaneously with this application filed Swedish Patent Application, with the same Applicant and inventor, and which has been given the title "A method of sealingly packing piece goods in a bag, as well as bag units adapted herefor."

The present invention is then based on that a utilised, carrier strip of the associated type provided with a thickened portion, or a transport strip otherwise, may have the form of a thin plastic film.

BACKGROUND OF THE INVENTION

Methods, arrangements and constructions related to the above disclosed technical field and the property disclosed by way of introduction for an integrated container and carrier strip and with a carrier strip (or both) integrated with the upper open edge portion of the container, are previously known in numerous different embodiments.

Thus it is previously known to disclose a container, in the form of a plastic film, with edge rigidifying and specially formed thickened portions within the carrier strip, formed by a folding of the plastic film material and where such an integrated bag unit is more closely shown and described in International Patent Application PCT/SE2004/001271, with publication number WO-A1-2005/023693.

Taking into account the properties associated with the invention that there are previously known different methods for edge folding a plastic film material for forming a material thickened portion.

Thus Patent Publication EP-A1-0 063 868 shows a material adapted for packaging where an L- or T-shaped union is to be able to take place of the edges of a plastic coated paper web, where FIGS. 12, 13 and 14 illustrate different folding processes.

Patent Publication FR-A1-2 676 194 permits illustration of an edge folding of a sheet for reinforcing the edge portions.

Patent Publication EP-A2-1 095 759 illustrates how a film (40) is to be able to display permanently united edges (43) and which in all essentials can be invisible.

To this end use is made of a folding apparatus (30) which creates double-folded edges (43) which are caused to pass an apparatus with two warm or hot rollers (15, 16).

Patent Publication EP-A1-0 437 848 discloses an apparatus for folding the edges (11) of a continuous fabric (10).

Patent Publication EP-A1-0 798 101 discloses a method of producing a thickened portion for in any event the one edge of a plastic foil or -film with a thickness of 0.02 to 0.2 mm and where the thickened portion is edge associated and with an allocated thickness of 0.03 to 2 mm.

BRIEF SUMMARY OF THE PRESENT INVENTION

Technical Problem

Taking into account the circumstance that the technical considerations which a person skilled in the art must do in order to be able to offer a solution to one or more set technical problems is on the one hand initially a necessary insight of the measures and/or the sequence of measures to be implemented and on the other hand a necessary selection of the means required in view hereof, the following technical problems are likely to be relevant in the evolution of the subject matter of the present invention.

Taking into account the state of the art as described above, it is probably therefore likely to be seen as a technical problem to be able to realise the importance of, the advantages associated with and/or the technical measures and considerations which will be required in order, in an application disclosed by way of introduction, as regards permitting the retention of a bag, adapted for one or more piece goods, and to cause a carrier strip to be particularly formed in order to create an interjacent means, between a carrier device formed with a slit and a separately manufactured bag and where the carrier strip can then be formed from a first plastic material while the bag can be formed from the same or of an optionally other material, however where the preconditions exist for causing a permanent unification of the bag's opening allocated and opposing edge surfaces each to its elongate plastic film surface, each related to its carrier strip.

There resides a technical problem in being able to realise the importance of, the advantages associated with and/or the technical measures and considerations which will be required in order for said plastic film for the carrier strip to permit application and/or supply said thickened portion as a separate plastic strand and that the plastic film and the thickened portion thereby become integrately formed and securing with one another.

There resides a technical problem in being able to realise the importance of, the advantages associated with and/or the technical measures and considerations which will be required in order for a thin plastic film to be caused to apply an extruded warm (hot) plastic strand whose thermal content is to be adapted in order to locally cause the melting of the thin plastic film in any event a part of the plastic film's material which is adapted to support and be united to the plastic strand.

There resides a technical problem in being able to realise the importance of, the advantages associated with and/or the technical measures and considerations which will be required in order to select a utilised thin plastic film which will be able to display a selected room temperature, while the plastic strand, immediately after an extrusion, can be selected to an adapted temperature such as slightly under 200° C., for example 180 to 190° C.

There resides a technical problem in being able to realise the importance of, the advantages associated with and/or the technical measures and considerations which will be required in order to cause the thin plastic film to be selected to be a thickness of between 0.02 and 0.5 mm.

There resides a technical problem in being able to realise the importance of, the advantages associated with and/or the technical measures and considerations which will be required in order to cause said plastic strand to be selected to a thickness adapted to the thickness of the plastic film and with a cross sectional area corresponding to a circular cross section, such as between 1.0 and 3.0 mm in diameter.

There resides a technical problem in being able to realise the importance of, the advantages associated with and/or the technical measures and considerations which will be required in order to cause said thickened portion to be directly edge-related said plastic film's planar surface.

There resides a technical problem in being able to realise the importance of, the advantages associated with and/or the technical measures and considerations which will be required in order to cause said thickened portion to be edge-related said plastic film's planar surface and oriented at a selected short distance from a first longitudinal free edge portion of said plastic film.

There resides a technical problem in being able to realise the importance of, the advantages associated with and/or the technical measures and considerations which will be required in order to cause a second longitudinal edge portion of said plastic film, opposing said first longitudinal free edge portion carrying said thickened portion, to be intended for a cooperation with an edge region oriented adjacent an opening of the bag.

There resides a technical problem in being able to realise the importance of, the advantages associated with and/or the technical measures and considerations which will be required in order to permit the increase of the production speed of utilised carrier strips and thereby produce two parallel and extruded plastic strands which then shall be applied along a wide plastic film's central elongate portion and close to one another and that a bifurcation of the wide plastic film between the plastic strands gives a possibility for simultaneously allowing the production of two individual carrier strips.

There resides a technical problem in being able to realise the importance of, the advantages associated with and/or the technical measures and considerations which will be required in order to cause said thickened portion and/or said thin plastic film to consist of an LDPE plastic (Low Density Polyethylene Plastic).

There resides a technical problem in being able to realise the importance of, the advantages associated with and/or the technical measures and considerations which will be required in order to cause said cooperation between a carrier strip and the bag's upper opening-related edge portion to take place via a plastic welding, a hot welding, a gluing, a plastic melting gluing or corresponding fixing technique between selected like or unlike materials.

Solution

The present invention in such instance departs from the prior art technique disclosed by way of introduction where carrier strip or transport strip is to be adapted, with an edge-related thickened portion, to be able to cooperate with a carrier device formed with a slit in order to fixedly retain a container or bag adapted for one or more piece goods, where the carrier strip otherwise has the form of a thin plastic film.

In order to be able to solve one or more of the above disclosed technical problems the present invention specifically discloses that the prior art technique be complemented with that to said thin plastic film said thickened portion shall be applied as a warm (hot) extruded plastic strand and that the plastic film and the thickened portion thereby become through a local melting integrated formed with one another for forming of said carrier strip.

As proposed embodiments, falling within the scope of the basic idea of the present invention, it is moreover disclosed that when to the utilised thin plastic film there is applied an extruded warm plastic strand, the thermal energy content of the plastic strand shall be adapted to melt a local part of or all of the plastic film material which is adapted to support the warm plastic strand.

It is further disclosed that the plastic film shall be selected to room temperature while the plastic strand shall be selected to a considerably higher temperature, such as about or slightly under 200° C.

More specifically, it is disclosed that the thin plastic film shall be able to be selected to a thickness of thinner than 0.5 mm while the plastic strand shall, depending upon selected temperature and other criteria, be able to be selected a thickness adapted to the thickness of the plastic film and with a selected cross sectional surface.

Within the scope of the present invention also falls that said thickened portion shall be edge-related and be able to be supported by said plastic film and its planar surface.

The present invention discloses then, as a first embodiment, that said thickened portion shall be edge-related said plastic film and oriented at a selected slight distance from a first longitudinal free edge portion of the planar surface of said plastic film.

Further the invention discloses that a second longitudinal edge portion for said plastic film, the edge portion which is opposed to the first longitudinal edge portion supporting said thickened portion, shall be intended for a fixed cooperation with an edge region oriented adjacent an opening for the bag.

Within the scope of the invention also falls that two parallel plastic strands shall be able to be applied simultaneously along a wide plastic film's central elongate portion and close to one another and that a bifurcation of the plastic film between the plastic strands gives two separate and complete carrier strips, one for each edge region, oriented adjacent an opening for the bag.

Further the invention discloses that said thickened portion and/or said thin plastic film shall be able to consist of an LDPE plastic.

It is further disclosed that a coordination which is sought for between a second longitudinal edge portion for the thin plastic film and an edge region, oriented adjacent an opening for the bag, take place via a plastic welding, a hot plastic welding, a gluing, a plastic melting gluing or similar fixing process.

Advantages

Those advantages which may principally be deemed to be characteristic of the present invention and the specific significative characterising features disclosed thereby are that there have hereby been created the preconditions in order with the help of a separately produced carrier strip to be able to create the preconditions for the carrier strip to be able to cooperate and fixedly retain a bag, adapted for one or more piece goods, and in that int. al. the carrier strip can be produced from a recoverable material the carrier strip can be produced under restricted costs and in addition the utilised bag material can be selected independently of the material of the carrier strip, however on conditions that a carrier strip's longitudinal (second) edge portion be able to fixedly cooperate with an edge region, oriented adjacent an opening for the bag, and where said cooperation can take place via a plastic welding, a hot welding, a gluing, a plastic melting gluing or corresponding fixing process.

That which may principally be deemed to be characteristic of a carrier strip in accordance with the present invention, is disclosed in the characterising clause of appended claim 1.

BRIEF DESCRIPTION OF THE ACCOMPANYING DRAWINGS

Figure 2:
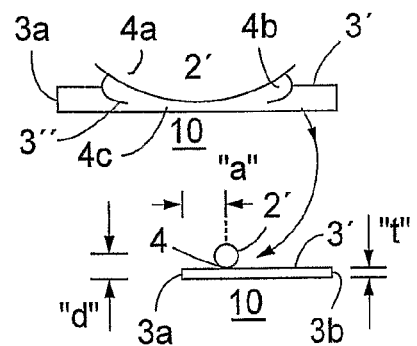
Figure 3:
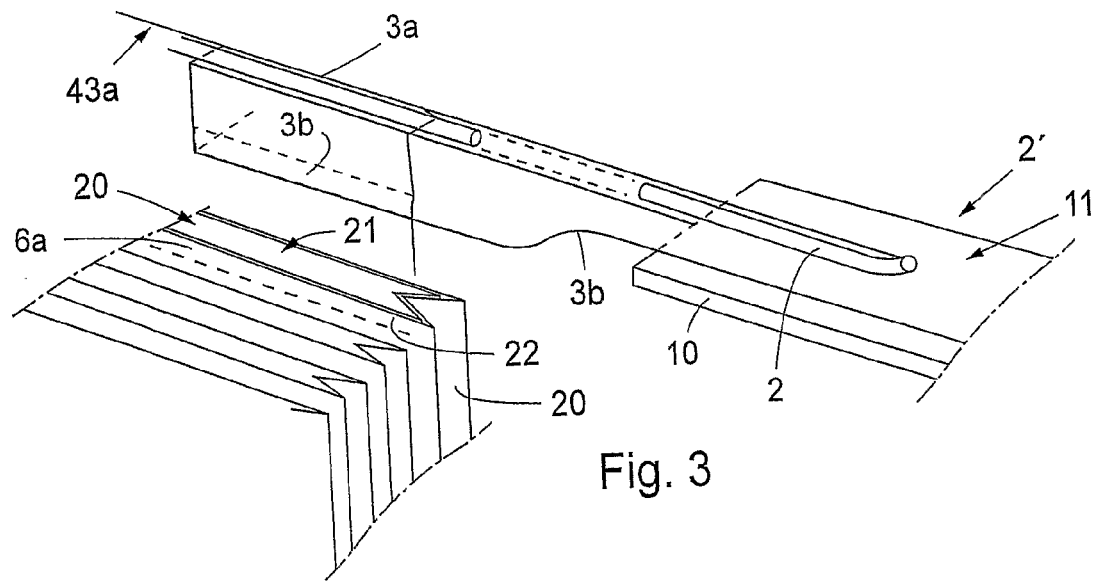
Figure 4:
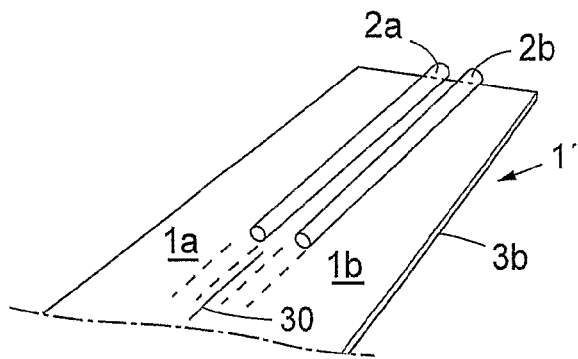
Figure 5:
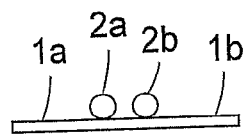
Figure 6:
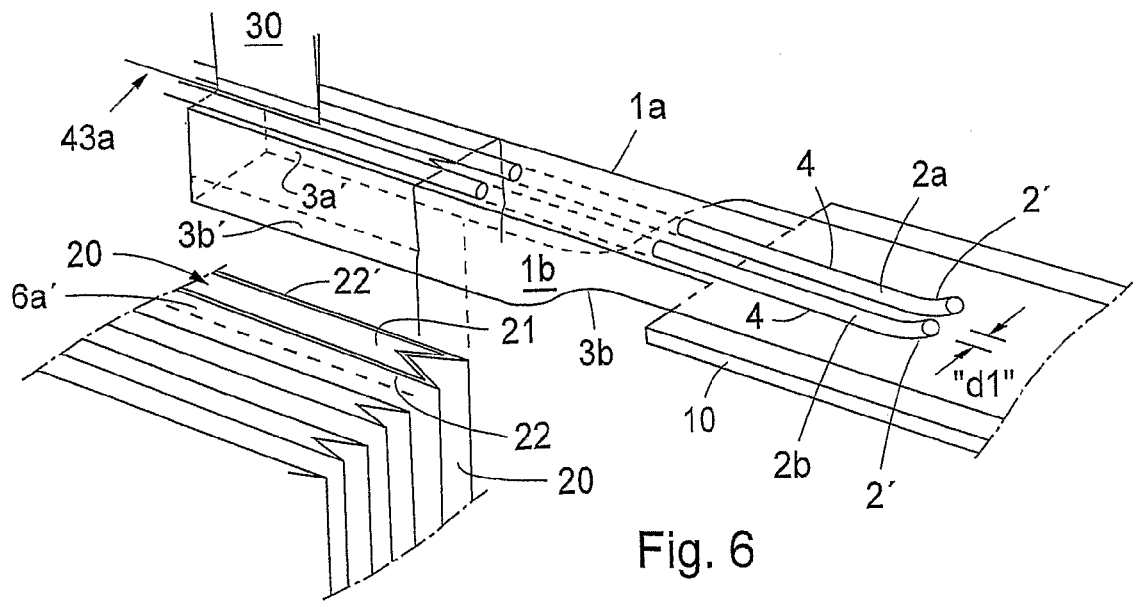

Two currently proposed embodiments, displaying the significative characterising features associated with the present invention, will now be described in greater detail hereinbelow for purposes of exemplification, with a reference to the accompanying Drawing, where;

FIG. 1 shows in perspective illustration a first embodiment of a carrier strip according to the present invention, FIG. 2 shows in a cross section a carrier strip according to FIG. 1 with a magnified view intended to illustrate that a utilised thin plastic film and an extruded thickened portion are integrated formed with one another, via an intimated melting zone, FIG. 3 shows how a carrier strip, according to FIGS. 1 and 2, shall be able to be brought into cooperation with an edge region, oriented adjacent an opening for the bag, and where this cooperation takes place via a plastic welding, a hot welding, a gluing, a plastic melting gluing or similar fixing material dependent process, FIG. 4 shows in perspective presentation a second embodiment of a carrier strip, given a width corresponding to double the width of the carrier strip, according to FIG. 1, and to whose central region are applied, by an extrusion, two parallel plastic strands along the wide plastic film's central elongate portion and close to one another, in order via a subsequent bifurcation, oriented between the plastic strands, to create two separate carrier strips, according to FIGS. 1, 2 and FIG. 3, FIG. 5 shows the carrier strip, according to FIG. 4, in cross section and where the integrated cooperation between the plastic film and the thickened portion has its counterpart in the magnified view shown in FIG. 2 and where the intimated melting zone and FIG. 6 shows in perspective view, like that according to FIG. 3, where a doubled carrier strip, according to FIG. 3, is utilised in order to be applied and fixed to opposing edge regions of an opening for a bag and where the carrier strip has been bifurcated between the plastic strands and thereby forms two separate carrier strips.

DESCRIPTION OF CURRENTLY PROPOSED EMBODIMENT

It should then by way of introduction be emphasised that in the following description of one currently proposed embodiment, which displays the significative characterising features associated with the invention and which is clarified by means of the figures shown in the appended Drawings, we have allowed the selection of terms and a special terminology with the intention in such instance principally of allowing clarification of the inventive idea.

It should however in this context be observed that expressions selected here shall not be seen as restrictive exclusively to the here utilised and selected terms but that it should be understood that each thus selected term is to be interpreted so that it in addition encompasses all technical equivalents which function in the same or substantially the same manner in order in such instance to be able to attain the same or substantially the same intention and/or technical effect.

With a reference to the accompanying figures there are thus shown schematically and in detail the basic preconditions of the present invention and where the significative properties associated with the invention have been given concrete form through the now proposed and hereinafter more closely described embodiment.

Thus, FIG. 1 allows to show in a perspective presentation a short section of a carrier strip 1, according to a first embodiment of the invention.

This carrier strip 1 is adapted in order with an extruded and edge-related thickened portion 2 to be able to cooperate with a carrier device (not shown), formed with a slit, in order to fixedly retain a bag, adapted for one or more piece goods, where the carrier strip otherwise is in the form of a plastic film 3.

An arrangement with the utilisation of one or two, carrier devices formed with a slit in order to fixedly retain one or both edge portions of a bag, adapted for one or more piece goods, and where each respective carrier strip otherwise has the form of a plastic film is shown more closely and described in a simultaneously with this application filed Patent Application with the same Applicant, as mentioned above.

Particularly with a reference to FIG. 2 there is illustrated that said plastic film 3 supports on its upper planar surface 3' the thickened portion 2 and the thickened portion 2 and the plastic film 3 are via a melting process integrated formed with one another, which is clarified in the magnified view, in association with FIG. 2.

More specially the present invention discloses that to the upper surface 3' of the plastic film 3 there shall be applied an extruded warm or hot plastic strand 2, whose thermal content is to be adapted so that it allows to melt a part of or all of the plastic film material 3" which is adapted to allow the support of the plastic strand 2 against a cooling support surface 10.

Formed melting zones 4 are in FIG. 2 disclosed by reference numeral 4a, 4b and 4c in order to illustrate an assumed melting local distribution of the plastic material in the plastic strand 2 and the plastic film 3.

More specially the present invention discloses that during the production process the plastic film 3 can be selected to room temperature or thereabout or as an alternative a temperature reduction under room temperature can be offered all while the plastic film 3 rests against and is displaced along the support surface 10.

Nothing prevents to allow the cooling of the plastic film 3 by means of an air current under the plastic film 3 and over the support surface 10.

Here adapted measures are to be related to the thickness and the material of the plastic film, the thickness and the material of the plastic strand, the temperatures of the plastic film and the extruded plastic strand as well as measures for cooling a united plastic film and plastic strand.

The plastic strand 2 is thus extruded from a nozzle 11 not shown and where the temperature of the plastic strand 2, via reference numeral 2' is to be selected to a temperature which normally can somewhat fall below 200° C. and in LDPE plastic, say 180 to 190° C.

Further the plastic film 3 can be selected to a thickness "t" which normally falls below 0.5 mm, in LDPE plastic the thickness can be selected to 0.02 mm or slightly thicker values, principally depending upon set mechanical strength requirements.

The plastic strand 2 shall in the normal case be selected to slightly fall below the cross section of the slit but can also be selected to a thickness "d" adapted to the thickness "t" for the plastic film 2 and with a cross sectional area of $2–4\times10^{-5}$ m$^2$.

Even if a circular cross section can be preferable it should be observed that within the scope of the invention also fall other cross sectional forms, however adapted easily to be able to be displaced along the slit formed in the carrier device.

In a circular cross section for the plastic strand it can be selected with a cross sectional surface corresponding to a diameter of between 1.0 and 3.0 mm.

Specially FIG. 2 discloses that said extruded thickened portion 2 shall be edge-related said plastic film's 3 upper surface 3', where a first free edge has been given reference numeral 3a.

More specially it is disclosed that said extruded thickened portion 2 shall be edge-related said plastic film 3 and oriented at a selected distance "a" from the first longitudinal edge 3a for said plastic film's 3 upper planar surface 3'.

A second longitudinal edge portion 3b for said plastic film 3, opposed to the first longitudinal edge 3a carrying said thickened portion 2, is intended for a cooperation with an edge region 22, oriented adjacent an opening 21 for the bag 20, which edge region more closely is illustrated in FIG. 3.

FIGS. 4, 5 and 6 allow illustration of the possibility of simultaneously being able to produce two individual carrier strips 1a, 1b in that to a wide plastic film 1' cause application of two parallel plastic strands 2a, 2b along a central elongate portion close to one another and that a bifurcation 30 between the plastic strands 2a, 2b gives two complete carrier strips, designated 1a and 1b in FIG. 4.

Said thickened portions 2a, 2b and/or plastic film parts can advantageously consist of an LDPE plastic and where said cooperation between the second longitudinal edge portion 3b for the carrier strip and an edge region 22 oriented adjacent an opening for the bag, shall then take place via a per se previously known plastic welding, a hot welding, a gluing, a plastic melting gluing or corresponding fixing process.

FIG. 5 and FIG. 6 allow illustration of productions of two carrier strips 1a, 1b simultaneously and where one carrier strip (1b) displays an edge portion 3b' for a cooperation with the edge portion 22 and one carrier strip (1a) displays an edge portion 3a' for a cooperation with the edge portion 22' as well as the utilisation of an interjacent oriented cutting device 30.

The invention is naturally not restricted to the embodiment disclosed by way of example above but can undergo modifications without departing from the inventive concept illustrated in the appended Claims.

Specially it should be observed that each shown unit and/or circuit can be combined with every other shown unit and/or circuit within the framework in order to be able to attain the desired technical function.

The invention claimed is:

1. A carrier strip comprising:
    (a) a plastic film comprising an upper plane surface, a first longitudinal edge portion and a second longitudinal edge portion opposing said first longitudinal edge portion;
    (b) a bag having an opening for insertion of piece goods and an edge portion adjacent said opening, said edge portion of the bag being fixed to the second longitudinal edge portion of the plastic film; and
    (c) means integrally formed with the plastic film for cooperation with a slit of a carrier device for fixedly retaining the bag and enabling displacement of the carrier strip in relation to the carrier device, said means being disposed on the upper plane surface of the plastic film near and along a length of the first longitudinal edge portion and spaced from the second longitudinal edge portion.

2. The carrier strip according to claim 1, wherein the edge portion of the bag is fixed to the second longitudinal edge portion of the plastic film by welding or gluing.

3. The carrier strip according to claim 2, wherein the edge portion of the bag is fixed to the second longitudinal edge portion of the plastic film by welding.

4. The carrier strip according to claim 3, wherein the welding is plastic welding or hot welding.

5. The carrier strip according to claim 2, wherein the edge portion of the bag is fixed to the second longitudinal edge portion of the plastic film by gluing.

6. The carrier strip according to claim 2, wherein the gluing is plastic melting gluing.

7. The carrier strip according to claim 1, wherein the means comprises an elongate thickened plastic strand.

8. The carrier strip according to claim 7, wherein the plastic strand is integrally formed with the plastic film by a process comprising the steps of (a) applying an extruded plastic strand to the upper plane surface of the plastic film with the extruded plastic strand at a temperature that melts at least a part of the plastic film and (b) allowing the extruded plastic strand and the melted part of the plastic film to cool.

9. The carrier strip according to claim 8, wherein, in the step (a), the temperature of the extruded plastic strand is under 200° C. and the plastic film is at room temperature.

10. The carrier strip according to claim 7, wherein the plastic film has a thickness of under 0.5 mm.

11. The carrier strip according to claim 7, wherein the thickened plastic strand has a cross sectional area with a diameter of 1 to 3 mm.

12. The carrier strip according to claim 7, wherein the thickened plastic strand, the plastic film or both consists of a low density polyethylene plastic.

13. The carrier strip according to claim 7, wherein the carrier strip is formed by a process comprising applying two parallel elongate plastic strands to a central elongate portion of a precursor plastic film and cutting the precursor film in a region between the two parallel elongate plastic strands to form the carrier strip and a second carrier strip.

14. A carrier strip comprising:
    (a) a plastic film comprising an upper plane surface, a first longitudinal edge portion and a second longitudinal edge portion opposing said first longitudinal edge portion;
    (b) a bag having an opening for insertion of piece goods and an edge portion adjacent said opening, said edge portion of the bag being fixed to the second longitudinal edge portion of the plastic film; and
    (c) an elongate thickened plastic strand integrally formed with the plastic film for cooperation with a slit of a carrier device for fixedly retaining the bag and enabling displacement of the carrier strip in relation to the carrier device, said elongate thickened plastic strand being disposed on the upper plane surface of the plastic film near and along a length of the first longitudinal edge portion and spaced from the second longitudinal edge portion.

15. The carrier strip according to claim 14, wherein the plastic film has a thickness of under 0.5 mm.

16. The carrier strip according to claim 14, wherein the thickened plastic strand has a cross sectional area with a diameter of 1 to 3 mm.

17. The carrier strip according to claim 14, where the thickened plastic strand, the plastic film or both consists of a low density polyethylene plastic.

\* \* \* \* \*